(12) United States Patent
Spensberger (10) Patent No.: US 6,283,869 B1
(45) Date of Patent: Sep. 4, 2001

(54) TOOTHED COUPLING

(75) Inventor: Christoph Spensberger, Paulsdorf (DE)

(73) Assignee: KWD Kupplungswerk Dresden GmbH, Dresden (DE)

( * ) Notice: Subject to any disclaimer, the term of this patent is extended or adjusted under 35 U.S.C. 154(b) by 0 days.

(21) Appl. No.: 09/202,739

(22) PCT Filed: Jun. 11, 1997

(86) PCT No.: PCT/DE97/01175

§ 371 Date: Dec. 14, 1998

§ 102(e) Date: Dec. 14, 1998

(87) PCT Pub. No.: WO97/47894

PCT Pub. Date: Dec. 18, 1997

(30) Foreign Application Priority Data

Jun. 12, 1996 (DE) .......................................... 296 10 299 U (51) Int. Cl.⁷ ...................................................... F16D 3/18
(52) U.S. Cl. ........................... 464/153; 464/169; 464/154
(58) Field of Search ............................ 464/16, 147, 149, 464/153, 154, 162, 169, 904, 158, 79; 267/181, 182; 285/299

(56) References Cited

U.S. PATENT DOCUMENTS

| | | | | |
|---|---|---|---|---|
| 1,770,743 | * | 7/1930 | Morgan | 464/16 |
| 1,843,211 | * | 2/1932 | Davis | 464/169 |
| 2,104,669 | | 1/1938 | Peterson . | |
| 2,403,389 | * | 7/1946 | Morey | 464/154 |
| 2,510,414 | * | 6/1950 | Hoelle et al. | 285/301 |
| 3,815,887 | * | 6/1974 | Curtis et al. | 267/91 |
| 4,650,441 | * | 3/1987 | Lepson | 464/79 |
| 4,877,224 | * | 10/1989 | Watts | 267/140 |
| 4,895,352 | * | 1/1990 | Stumpf | 257/80 |
| 5,370,427 | * | 12/1994 | Hoelle et al. | 285/301 |
| 5,911,630 | * | 6/1999 | Shigeura | 464/154 |

FOREIGN PATENT DOCUMENTS

WO9527151  3/1995 (WO) .

* cited by examiner

*Primary Examiner*—Lynne H. Browne
*Assistant Examiner*—Kenn Thompson
(74) *Attorney, Agent, or Firm*—Horst M. Kasper (57) ABSTRACT

The invention relates to a toothed coupling, especially a double toothed coupling, for rail vehicles, essentially consisting of a coupling housing (2) and at least one coupling component (3, 4) fitted inside the coupling housing (2), the coupling component has first teeth (9, 10) in its peripheral region (7) and the coupling housing has second teeth (11, 12) in its peripheral region (8) which form engaging teeth (13, 14) with the first teeth of the coupling component (3, 4) which are movable in relation to one another, and there is at least one annular disk-shaped support cover (21, 22) protecting the engaging teeth (13, 14) at the respective faces (19, 20) between the coupling housing (2) and the coupling component (3, 4). A toothed coupling is to be provided in which an exchange of media and, with the coupling rotating, irregular running, imbalance and wear of the sealing elements is prevented. To achieve this, there is at least one axial corrugated pipe (18, 47) positioned between the coupling housing (2; 5, 6) and each coupling component (3, 4) secured to at least one of both parts (2, 3; 2, 4 or 5, 3; 6, 4) which seals engaging teeth (13, 14) and also resiliently sets a predetermined position of the coupling housing (2; 5, 6).

29 Claims, 5 Drawing Sheets

TOOTHED COUPLING

The invention relates to a toothed coupling and in particular to a double toothed coupling for rail vehicles, essentially consisting of a coupling housing and at least one coupling component fitted inside the housing, the coupling component has first teeth in its peripheral region and the coupling housing has second teeth in its peripheral region which form engaging teeth with the first teeth of the coupling component which are movable in relation to one another, and there is at least one annular disc-shaped support cover protecting the engaging teeth at the respective faces between the coupling housing and the coupling component.

These toothed couplings are employed in most different areas of motive power engineering, such as for connecting a driving shaft to a driven shaft, when they consist of two torsionally rigid coupling components and when a relative movement occurs between the two shafts due to radial, vertical and/or angular displacements which needs to be compensated for by the coupling. The relative motion between coupling housing and coupling components including shafts, as a result, is transferred to the first and second teeth of the engaging teeth.

A toothed coupling and, in particular, a double toothed coupling for rail vehicles is disclosed in publication DE-GM 93 09 829.4 in which internally toothed coupling components are connected with an externally toothed coupling housing.

Between coupling housing and internal support cover, a coil spring is provided which serves to keep the coupling components in axial position. A disadvantage of the coil springs is that during rotation, imbalance and wear occur between spring and spring support with the rotating coupling due to its freely moving windings.

The radial faces between the coupling housing and the coupling components are completely sealed by means of elastic diaphragm sealing rings with convex front ends.

As the coupling rotates, the radial annular bulging of the diaphragm sealing rings may be reversed due to the strong centrifugal force thus possibly reducing the service life of the diaphragm sealing rings.

Moreover, the printing DE 295 06 461 reveals a double toothed coupling in which a contact-free gap seal consisting of a cover secured to the coupling housing is provided between the coupling housing and the coupling components as well as an additional sealing protection cap. In case of heavy strain, medium can flow through the still existing gap which finally does not represent a complete sealing.

Since there are generally no centring coil springs inside the coupling, ring elements to restrict displacement which are arranged opposite to each other with respect to their axial direction and consist of an elastic material are provided in order to limit the relative movement of the external gear between its internal and external areas; on the long term, said ring elements, however, are likely to wear out and are unable to centre the coupling.

A brochure "*Bogenzahnkupplungen, Basis Baureihen für Industrie-, Schiffs- und Meerestechnik*"[1], FIG. 9, printed in 1991, shows a toothed coupling featuring a diaphragm sealing ring at the front end and an internally mounted dynamic coil spring. Each coil spring is positioned between the respective internal flange covers and coupling components inside the coupling component chamber. The diaphragm sealing rings mounted at front ends provide that the coupling housing is completely sealed against the external area of the coupling component. In this embodiment, too, imbalance and wear occur as the coupling rotates due to the behaviour of the prestressed coil spring.

[1] "Curved teeth coupling, basic series for industrial, shipping and marine technology"

In the international patent application Wo 95/27151 a double coupling is disclosed, in which two internal coupling components are enclosed by a coupling housing. The internal teeth of the coupling components are positioned on a gear ring or gear star with circumferential round openings in axial direction which are directed towards the externally located support covers and in which the coil springs are arranged in such a way that they contact the annular support cover of the coupling housing. Since the individual coil springs are fitted in a highly elaborate manner into the multi-part support cover which has a conical shape with respect to the exterior of the coupling component and in that these support covers are screwed to the external face of the coupling so that they can be adjusted, they serve to centre the engaging teeth. With this configuration, too, media can be exchanged through the existing wedge-shaped tiny gaps at front ends between the components of the support cover. In the known toothed coupling sealings are subject to wear.

The aim of the invention therefore is to develop a toothed coupling which is designed in such a way that the exchange of media and, with the coupling rotating, irregular running, imbalance and wear of the sealing elements is prevented.

This is achieved by the features in claim 1. In the toothed coupling according to the generic term in claim 1, between the coupling housing and each coupling component, there is at least one axial corrugated pipe secured to at least one of both parts which seals the engaging teeth and also resiliently sets a predetermined position of the coupling housing.

Although, depending on how the peripheral regions of coupling housing and coupling components are positioned to each other, the engaging teeth and the corresponding corrugated pipes can be placed accordingly, i.e. outside or within the peripheral region of the coupling housing, the invention will be discussed hereunder in detail with respect to a toothed coupling in which the peripheral region of the coupling components faces the coupling housing.

Accurate dimensions of the corrugated pipes provide for non-slipping torque transmission.

Through the use of corrugated pipes, it is possible to save several parts for sealing and spring support. Referring to the invention, the smoothness of running is substantially improved by the shape and arrangement of the corrugated pipes.

The corrugated pipe is preferably shaped in the form of a bellow consisting of corrosion-proof material.

The corrugated pipe may be axially mounted with or without pretension between the coupling housing or the coupling housing components connected to the coupling housing and one coupling component respectively and, in case of axial relative movement of the coupling components, ensures that the coupling housing sets to its predetermined position preferably in the centre between both coupling components.

At its outer edge region at the front ends, the corrugated pipe may either be fitted with annular or flange-like fastening elements which are preferably arranged parallel in relation to each other. The fastening elements may consist of a plurality of rings, the outer edge region of the corrugated pipe being bonded to one of these rings particularly by welding.

Depending on the rigidity requirements, this corrugated pipe may be single-walled or multi-walled, the corrugated pipe preferably has a simple shape or is formed in multiple meanders as regards to its longitudinal section.

Depending on the intended strain, the corrugated pipe features an undulated geometry in which the outer envelope of the corrugated pipe preferably has a cylindrical or tapered shape or the like.

The radial support cover basically consists of an external fastening element and an internal fastening component and, depending on the position of the engaging teeth, is connected either to the coupling housing or the coupling component and to the corrugated pipe via its internal fastening component preferably by means of cramping or welding and largely covers the corresponding axial free space at front ends.

If the corresponding peripheral region of the coupling components is inside the coupling housing, the coupling components are provided with an annular recess preferably with a cavity-shaped cross section around its circumference at the respective front ends with respect to the interior of the coupling component in which the corrugated pipe is preferably mounted in central direction to the camber centre lines of the coupling component teeth and axially in relation to the axis of rotation of the coupling housing.

The external fastening element of the support cover may be secured to the coupling housing or the coupling halves, as the case may be, preferably by means of a releasable locking facility.

The external free spaces at front ends and the corresponding internal free spaces which represent the interior of the coupling component are interconnected by means of at least one pressure compensation opening through which lubricants and in particular oil as well as air can be exchanged for pressure compensation.

The free spaces allocated to each other serve the purpose of a pneumatic spring since they are completely sealed by means of the elastic corrugated pipe.

Irrespective of the design of the toothed couplings and in particular double toothed couplings, this invention makes it possible to completely seal the internal chambers between couplings components and coupling housing thus preventing media flowing from the inside to the outside and vice versa; lubricants can neither flow out of the free spaces nor can media flow into the engaging teeth, which largely increases the service life of the coupling. With the invention, both internal and external areas of the cambered teeth (coupling stars) of the coupling components are protected against wear on the long term. This aims at a toothed coupling in which lubrication is designed to provide long service.

Further, the corrugated pipe which is secured to the coupling housing and to at least one of the coupling components features closed walls and provides sealing and resilient properties thus enabling a simple construction of the coupling components so that material costs and assembly time can be reduced. If desired, the corrugated pipes can be positioned successively, one inside the other or parallel to each other in the recesses of the coupling components.

In addition, the engaging teeth of a coupling may preferably comprise one straight internal tooth gearing of the coupling housing and an engaging cambered external tooth gearing of the coupling component.

The invention can be employed in all toothed couplings irrespective of the design of the coupling components and the coupling housing and irrespective of where the teeth of the engaging teeth are positioned and how their design has been executed.

In relation to the invention and as described above, the corrugated pipes may also be secured to the coupling housing and the coupling components outside the peripheral region of the coupling housing; the coupling component teeth (first teeth) are designed as internal tooth gearing and the coupling housing teeth (second teeth) are designed as external tooth gearing with the peripheral regions of the coupling components enclosing the coupling housing at front ends and at its exterior. The coupling housing is positioned between the internally toothed coupling components as an externally toothed intermediary piece.

Further developments and suitable embodiments of the invention are described in further sub-claims.

The invention will become apparent in a more detailed description of an embodiment; reference will be made to several drawings, in which.

In the following FIGS. 1 to 5, the same reference signs are employed for similar parts.

Figure 1:
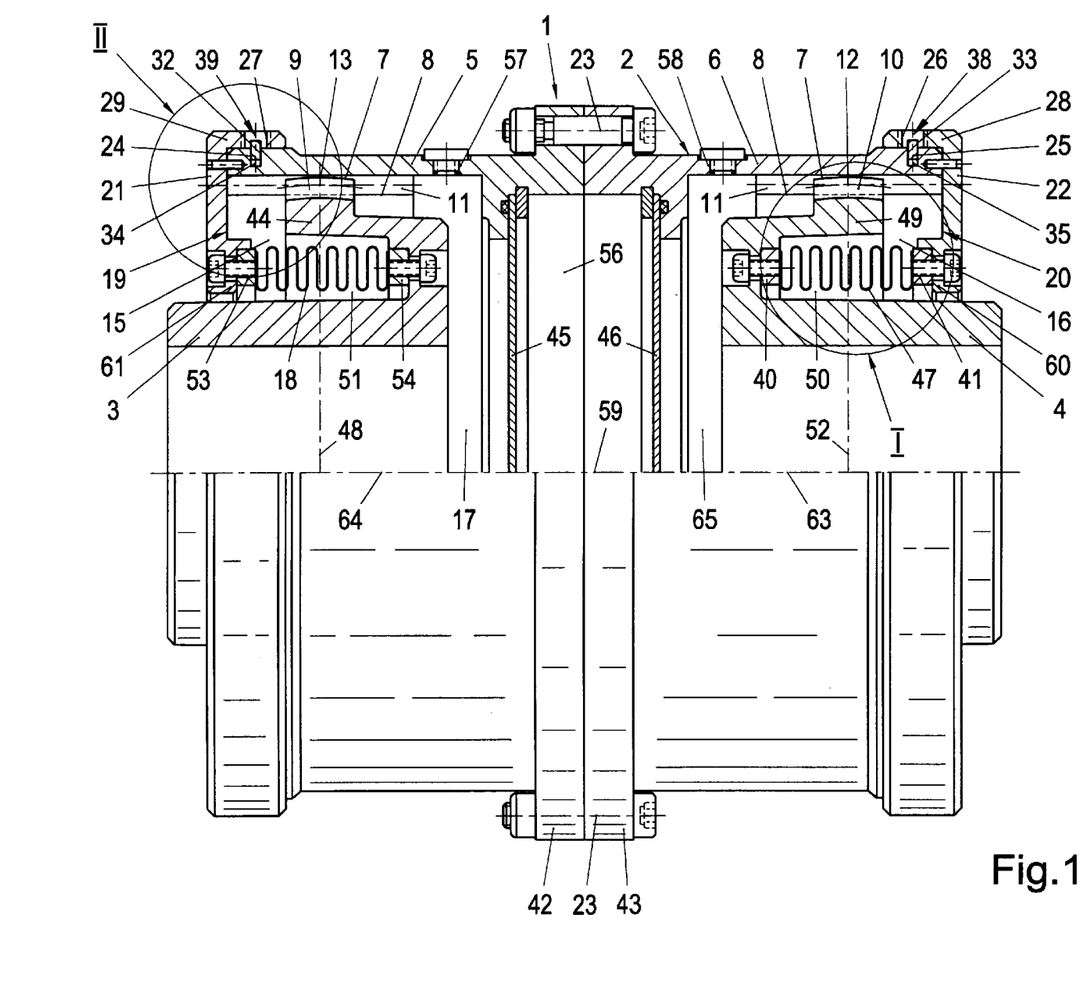
FIG. 1 is a diagrammatic view showing one half of a longitudinal section of a double toothed coupling related to the invention.

Referring to the invention, FIG. 1 depicts a toothed coupling and in particular a double toothed coupling 1 with a coupling housing 2 and two coupling components 3,4 which are, for example, developed as one part and are positioned in the coupling housing 2; the coupling components 3,4 each determine one internal coupling component chamber 17,65 inside the coupling housing 2 with a flange area 56 in between. For practical reasons, the coupling housing 2 consists of two, largely symmetric coupling halves (also called coupling sleeves or bushes) 5,6 bolted together by means of fit bolts 23 at flanges 42,43 which are provided at the coupling halves 5,6 and positioned opposite to one another comprising a radially positioned internal cover 45,46 sealing both internal coupling component chambers 17,65. At their external peripheral region 7, the coupling components 3,4 feature an external tooth gearing 9,10 (first teeth) with cambered coupling teeth. Coupling housing 2 features an internal tooth gearing 11,12 (second teeth) at its internal peripheral region 8. External tooth gearing 9,10 of coupling components 3,4 and internal tooth gearing 11,12 of coupling housing 2 each form engaging teeth 13,14 in the coupling halves 5,6, in which similar to the relative movement between the coupling components 3,4 and the coupling housing 2, the internal tooth gearing 12,13 and the external tooth gearing 9,10 are accordingly movable in relation to one another. The relative movement occurs in case of axial and/or angular displacement of the coupling components 3,4 in relation to the coupling housing 2 or the coupling halves 5,6 as the case may be. At axial faces 19,20 and between coupling halves 5,6 and the corresponding coupling component 3,4, there exists a circular outer free space 15 or 16 as the case may be.

At faces 19,20 of the coupling housing 2, there are support covers 21,22 which are basically shaped in the form of an annular disc and also feature a radial external fastening element 28,29 and a radial internal fastening component 60,61. The support covers 21,22 are secured to coupling housing 2 or, as the case may be, coupling halves 5,6 by means of their external fastening element 28,29 thus largely covering the axial free spaces 15,16 at the front end.

Referring to the invention, an axial corrugated pipe 18,47 is positioned between the coupling housing 2 or, as the case may be, coupling halves 5,6 and each coupling component 3,4 which is also secured to both parts 5,3 and 6,4 and seals the corresponding engaging teeth 13,14 and also resiliently sets a predetermined position of the coupling housing 2.

The corrugated pipe 18,47 is axially mounted between coupling halves 5,6 and one coupling component 3,4 and, with the coupling components 3,4 axially moving in relation to one another, sets coupling housing 2 to its predetermined central position between both coupling components 3,4. The corrugated pipe may be prestressed, i.e. it can be in a prestressed or relaxed condition with respect to pressure or tension.

Accurate dimensions of the corrugated pipes 18,47 provide non-slipping torque transmission.

The corrugated pipe preferably shaped in the form of a bellow consisting of corrosion-proof material.

At both outer edge regions, the corrugated pipe 18,47 is equipped with annular flange-like fastening elements 53,54 or with 40,41 and in particular bellow-type flanges which are preferably arranged parallel to one another. The corrugated pipe 18,47 may be bonded to its fastening elements 53,54 or 40,41 as the case may be particularly by welding.

The corrugated pipe 18,47 can be single-walled or multi-walled.

Figure 2:
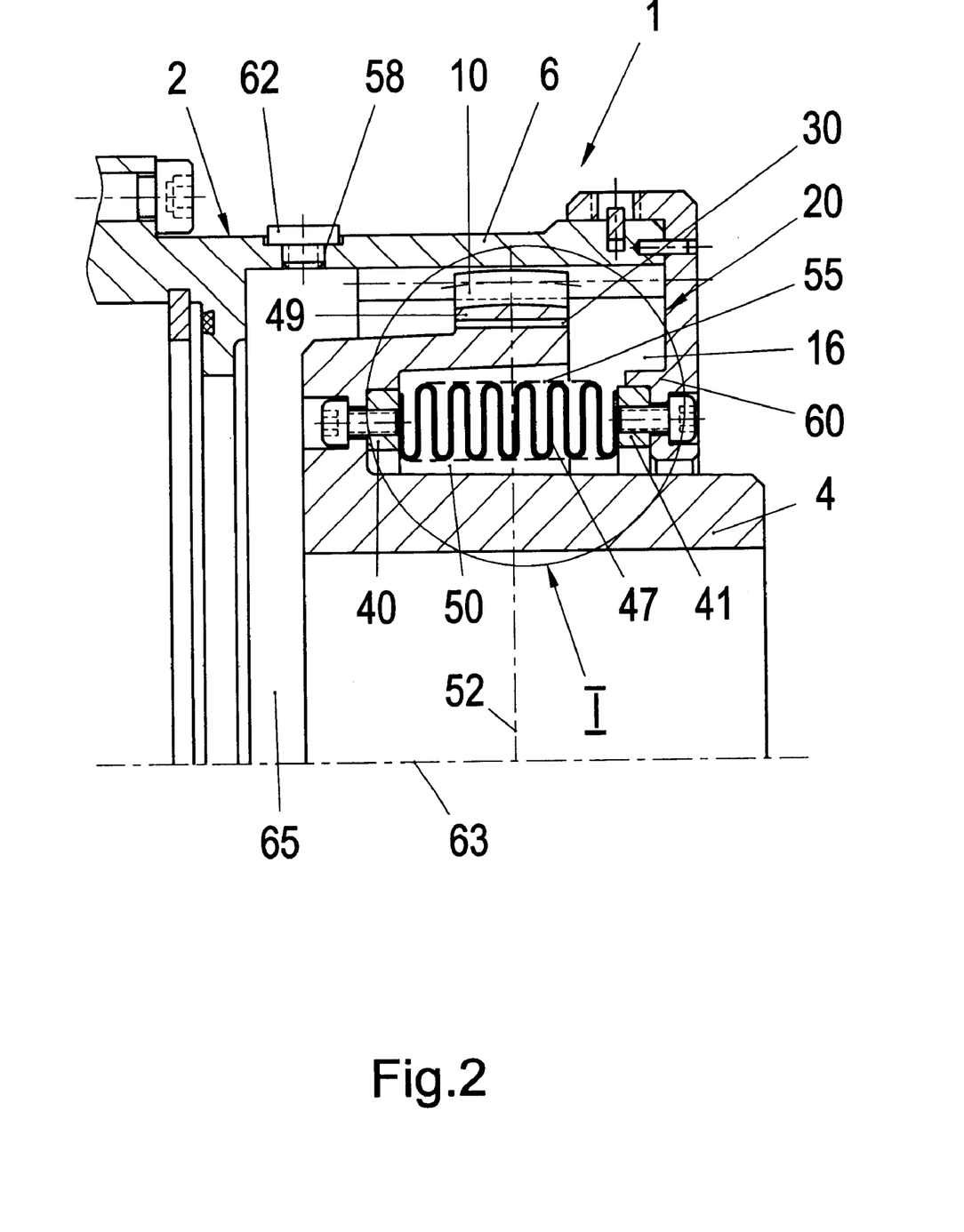
FIG. 2 is a magnified section of the corrugated pipe area in FIG. 1 taken along circular line I.

FIG. 2 is a magnified section of corrugated pipe 47 in central mounting position, however, reference is also made to the drawing on the left side in FIG. 1.

The corrugated pipe 47,18 may also have a simple shape or be formed in multiple meanders with respect to its longitudinal section.

Depending on the intended strain on clutch 1, it is possible to adjust the undulated geometry. Similarly, the outer envelope 55 of corrugated pipe 47,18 may also have a shape different from a cylindrical one.

The corrugated pipes 47,18 are secured to the internal fastening components 60,61 of support covers 22,21 at front ends.

At faces 20,19 and directed to the internal coupling component chamber 65,17, each coupling component 4,3 is provided with an annular or circular recess with cavity-shaped cross-section 50 or 51 in which the corrugated pipe 47 or 18 as the case may be is preferably mounted in central position to the cambered centre lines 52 or 48 as the case may be of the coupling component gearing 10,9 and axially to the corresponding support covers 22,21 in a prestressed manner. The corrugated pipes 18,47 may be mounted, for example, by bolting, welding or clamping or the like and the weld of at least one outer edge side of the corrugated pipe 47,18 can be extended through support covers 22,21 preferably without an own fastening element.

For practical reasons, the outer free spaces 16,15 can be connected to the corresponding internal coupling component chambers 65,17 representing the internal free spaces by means of at least one pressure compensation opening 30 (FIG. 2), 31 (FIG. 3) for the purpose of throttling so that lubricant and in particular oil as well as air can flow through the opening thereby compensating for the pressure.

Figure 3:
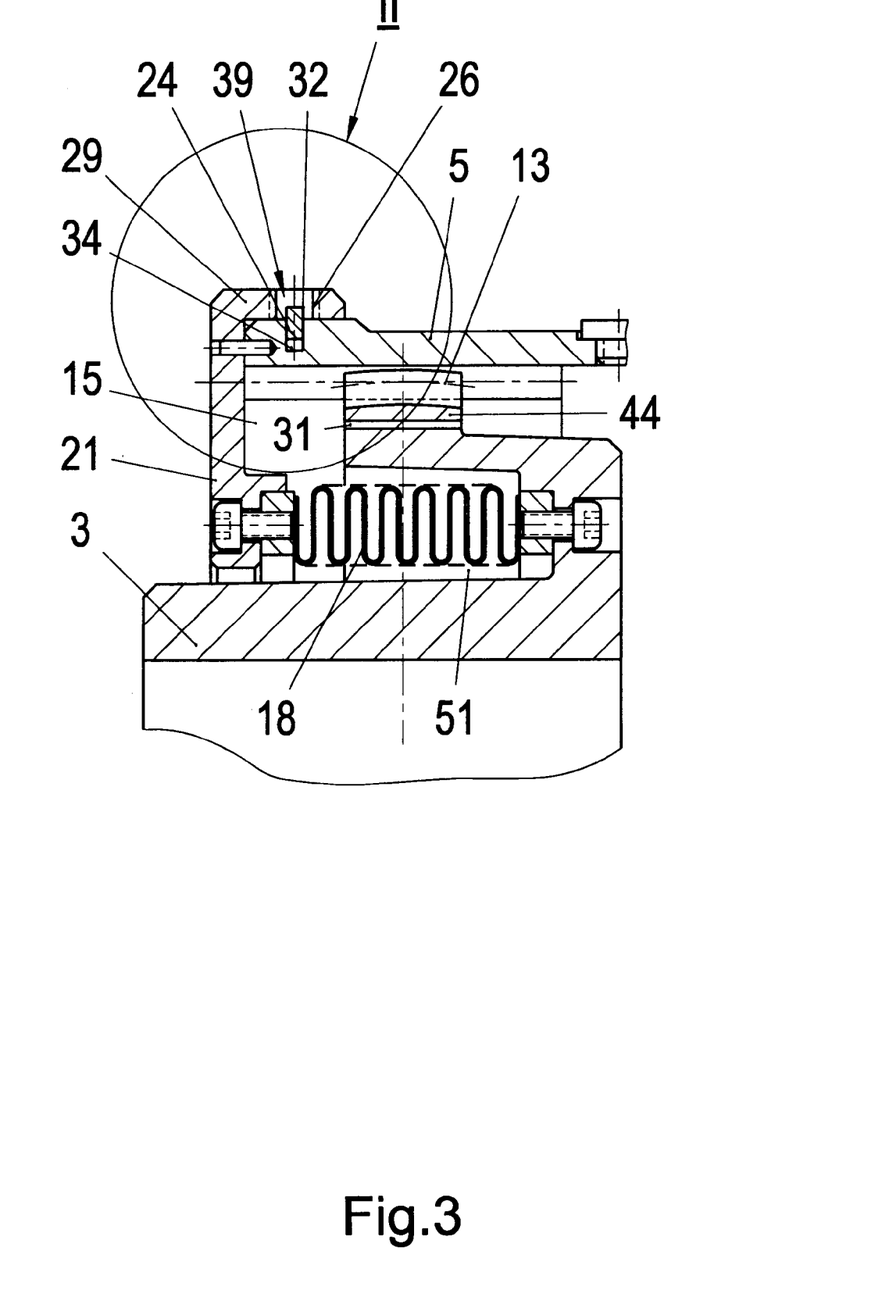
FIG. 3 is a magnified section (along circular line II) of the fastening area around the support cover in FIG. 1, FIG. 4. is a magnified section similar to FIG. 2 and 3 with a fastening element consisting of several rings secured to the corrugated pipe

The pressure compensation openings 30,31 are positioned in the corresponding connecting area of a protruding ring of external tooth gearing 49,44 preferably in paraxial direction between the outer free space 16,15 and the internal coupling component chamber 65,17.

On the other hand, the free spaces 16,65 or 15,17 as the case may be, which are allocated to each other, act as a pneumatic spring.

It is possible to adjust the performance of the pneumatic spring by changing the dimensions of the cross-sectional shape of pressure compensation openings 30,31.

To fill the internal coupling component chambers 65,17 with the lubricant oil, filling holes 58,57 which can be closed with a sealing plug 62 each, in particular with a screw plug, are provided in coupling housing 2 or, as the case may be, in coupling halves 6,5.

FIG. 3 discloses a magnified drawing of one part of the section according to FIG. 1. This FIG. 1 shall also be taken into account for explanation.

The support covers 21,22 are each secured to the coupling halves 5,6 by means of a releasable locking element 39,38 basically consisting of an external radial snap ring groove 34,35 in the coupling halves 5,6, a radial internal snap ring groove 32,33 in support covers 21,22 and a resilient ring, in particular spring ring 24,25, which engages with both opposite snap ring grooves 32,34 or 33,35 as the case may be during locking. The securing resilient rings 24,25 have a positive fit in relation to the snap ring grooves 32,33,34,45.

In order to release the locking of support covers 21,22, there are at least three openings and in particular threaded bores 26 or, as the case may be 27 which are arranged in a 120° angle each preferably as radial bore at the outside of the external fastening elements 29,28.

However, the support covers 21,22 may also be secured by simply screwing the external fastening elements 28,29 to the coupling halves 5,6 at front ends.

Figure 4:
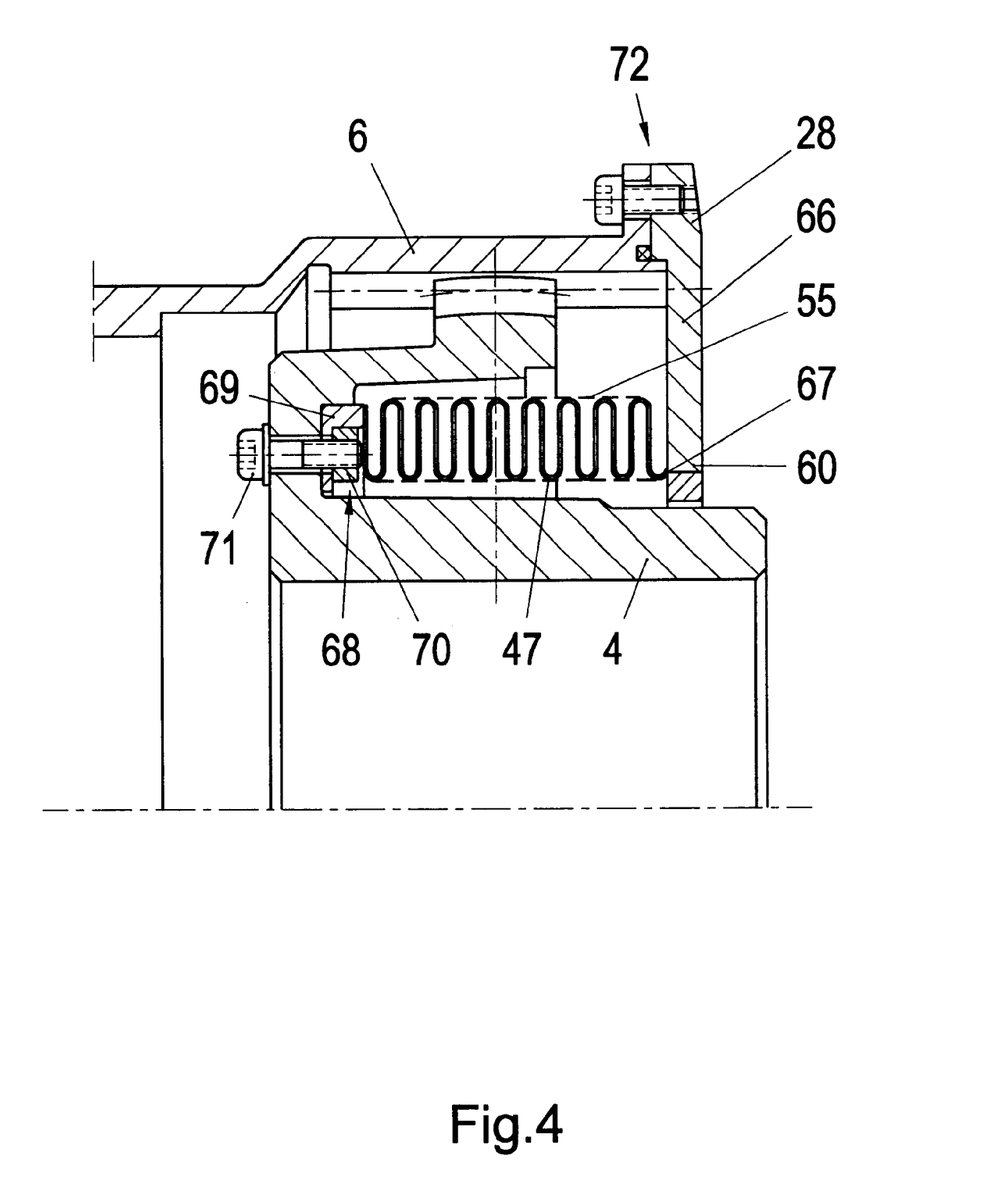

Similarly to FIG. 2,3, FIG. 4 shows a section in which the corrugated pipe 47 is secured to support cover 66 and to coupling component 4 in a simple mounting manner. For example, on the one hand, the corrugated pipe 47, at its face, may be directly secured, in particular by welding or clamping, to the corresponding support cover 66 at connection point 67 and within its outer edge region without a bonded fastening element.

On the other hand, the corrugated pipe 47 may feature an annular fastening element 68 positioned internally at the front ends at the other outer edge region and directed towards coupling component 4 which may consist of several rings as, for example, an external clamping ring 69 welded to the corrugated pipe 47 and an internal adjusting ring 70 fitted into and guided inside said clamping ring, said fastening element being secured to coupling component 4 by means of threaded drill inside adjusting ring 70 and corresponding screw locking 71 so that the clamping ring 69 is locked between adjusting ring 70 and coupling component 4.

In addition to the bonded connection of corrugated pipe 47 to the internal fastening component 60 of the corresponding support cover 66 which is easy to mount, also its external fastening element 28 may have a simple shape and, in particular, a flange-like shape and may be secured to the externally flanged coupling half 6, e.g., by a screwing 72. In double toothed couplings, the second corrugated pipe 18 is positioned in the same way.

While the ways of mounting the corrugated pipe 18,47 to support covers 21,22 or 66 and to coupling components 3,4 are discussed with reference to the drawings in FIG. 2,3,4, it is to be understood that the mounting possibilities are not restricted to these drawings.

Figure 5:
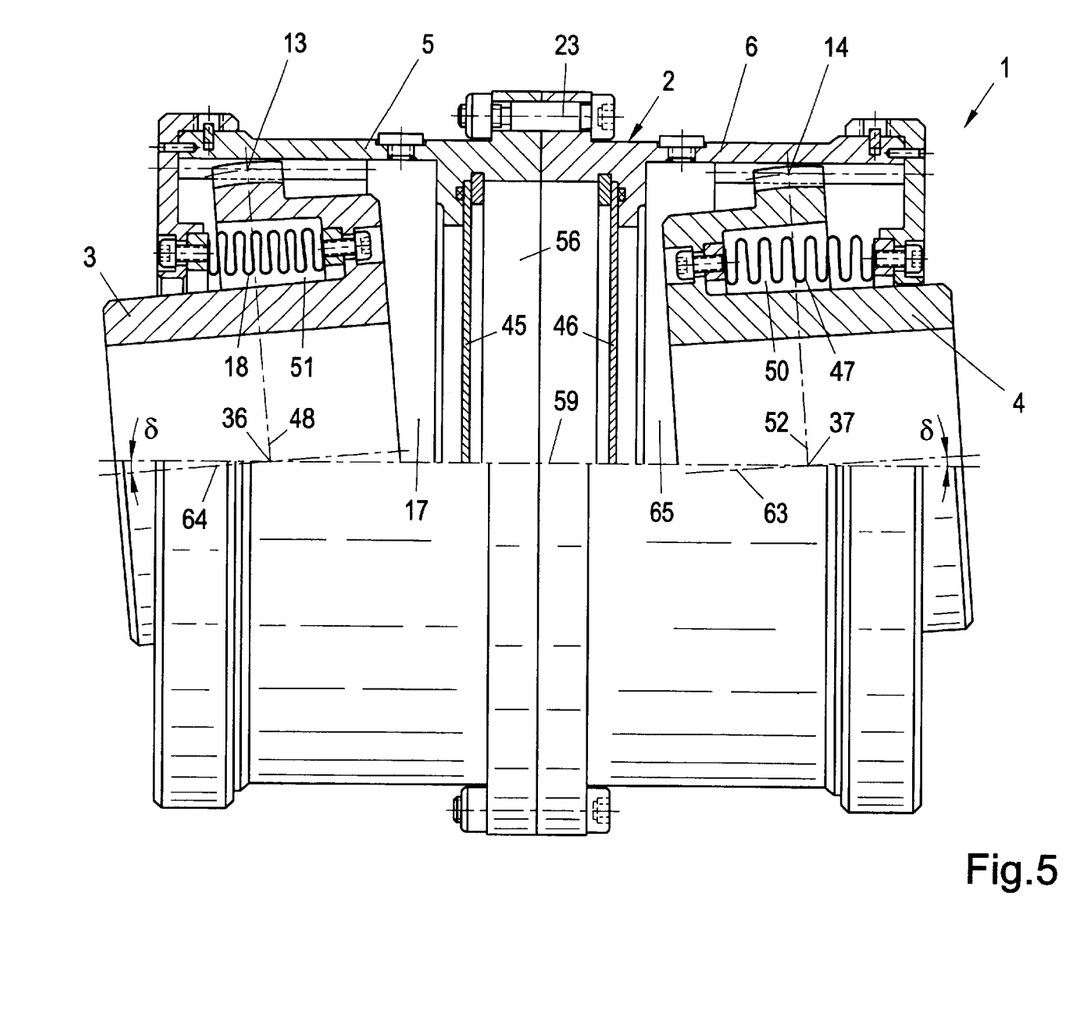
FIG. 5 is a diagrammatic view of a double toothed coupling according to FIG. 1, in which the coupling components are displaced in relation to their radial position.

Referring to FIG. 5, toothed coupling 1 in FIG. 1 related to the invention is depicted while being radially displaced.

In that the coupling components 3,4 (shafts) are displaced in relation to each other, a relative movement with respect to coupling housing 2 or coupling halves 5,6 as the case may be occurs which is represented by displacement angle α between the rotational axis 64,63 of the coupling components and the rotational axis 59 of the coupling housing respectively.

During displacement, the coupling housing 2 tilts in relation to the reference points on the camber centre line 36,37 and in this way, the corrugated pipes 18,47 are subject to plastic deformation.

Due to the initial tension of corrugated pipes 18,47 and the pneumatic cushions, it is possible to dispense with stopper elements not only in the lateral external regions of engaging teeth 13,14 but also in the entire toothed coupling 1 related to the invention in general.

The invention may also be employed in toothed couplings and in particular in double toothed couplings in which the engaging teeth consist of cambered second teeth (external tooth gearing) of the coupling housing or the coupling halves as the case may be and straight first teeth (internal tooth gearing) of the coupling components.

| Reference list | |
|---|---|
| 1 | double toothed coupling |
| 2 | coupling housing |
| 3 | coupling component |
| 4 | coupling component |
| 5 | coupling half |
| 6 | coupling half |
| 7 | peripheral region |
| 8 | peripheral region |
| 9 | external tooth gearing |
| 10 | external tooth gearing |
| 11 | internal tooth gearing |
| 12 | internal tooth gearing |
| 13 | engaging teeth |
| 14 | engaging teeth |
| 15 | free space |
| 16 | free space |
| 17 | internal coupling component chamber |
| 18 | corrugated pipe |
| 19 | face |
| 20 | face |
| 21 | support cover |
| 22 | support cover |
| 23 | fit bolts |
| 24 | ring |
| 25 | ring |
| 26 | opening |
| 27 | opening |
| 28 | external fastening element |
| 29 | external fastening element |
| 30 | pressure compensation opening |
| 31 | pressure compensation opening |
| 32 | internal snap ring groove |
| 33 | internal snap ring groove |
| 34 | external snap ring groove |
| 35 | external snap ring groove |
| 36 | reference point on the camber centre line |
| 37 | reference point on the camber centre line |
| 38 | locking element |
| 39 | locking element |
| 40 | fastening element |
| 41 | fastening element |
| 42 | flange |
| 43 | flange |
| 44 | external tooth gearing ring |
| 45 | internal cover |
| 46 | internal cover |
| 47 | corrugated pipe |
| 48 | camber centre line |
| 49 | external tooth gearing ring |
| 50 | recess |
| 51 | recess |
| 52 | camber centre line |
| 53 | fastening element |
| 54 | fastening element |

| -continued | |
|---|---|
| Reference list | |
| 55 | envelope |
| 56 | flange area |
| 57 | filling hole |
| 58 | filling hole |
| 59 | rotational axis of coupling housing |
| 60 | internal fastening component |
| 61 | internal fastening component |
| 62 | sealing plug |
| 63 | rotational axis of coupling component |
| 64 | rotational axis of coupling component |
| 65 | internal coupling component chamber |
| 66 | support cover |
| 67 | connection point |
| 68 | fastening element |
| 69 | clamping ring |
| 70 | adjusting ring |
| 71 | screw locking |
| 72 | screwed connection |
| δ | displacement angle |

What is claimed is:

1. A toothed coupling for rail vehicles, essentially consisting of a coupling housing and having a first peripheral region;

a coupling component fitted inside the coupling housing and having a second peripheral region;

first teeth having first faces and disposed in the first peripheral region of the coupling housing;

second teeth having second faces and disposed in the second peripheral region of the coupling component, wherein the first teeth are engaging with the second teeth of the coupling component, and wherein the first teeth are movable in relation to the second teeth and vice versa;

an annular disc-shaped support cover protecting the first teeth at their first faces and protecting the second teeth at their second faces between the coupling housing and the coupling component;

an axial corrugated pipe positioned between the coupling housing and the coupling component and secured to a member of the group selected from the coupling component and the coupling housing for sealing, the first teeth and the second teeth within a fluid chamber.

2. The toothed coupling according to claim 1, further comprising a second coupling component fitted inside the coupling housing having a third peripheral region;

third teeth having third faces and disposed in the third peripheral region of the second coupling component;

a second axial corrugated pipe positioned between the coupling housing and the second coupling component and secured to a member of the group selected from the second coupling component and the coupling housing for sealing the third teeth and the first teeth and for resiliently setting a predetermined position of the coupling housing relative to the second coupling component, wherein the first axial corrugated pipe is axially mounted between the coupling housing and the first coupling component, wherein the second axial corrugated pipe is axially mounted between the coupling housing and the second coupling component, wherein said first axial corrugated pipe and said second axial corrugated pipe provide that the coupling housing is adjusted to a predetermined position between the first coupling component and the second coupling component in case of an axial relative motion between the first coupling component and the second coupling component.

3. The toothed coupling according to claim 1, wherein the corrugated pipe consists of a bellow of corrosion-proof material;

wherein the coupling housing is formed by two coupling halves; and wherein the toothed coupling for rail vehicles is a double toothed coupling for rail vehicles.

4. The toothed coupling according to claim 3, wherein the axial corrugated pipe is at least single-walled.

5. The toothed coupling according to claim 4, wherein the axial corrugated pipe is formed at least in simple multiple meanders with respect to its longitudinal section.

6. The toothed coupling according to claim 5, wherein an undulated geometry of the axial corrugated pipe depending on an intended strain is constructed such that an outer envelope of the axial corrugated pipe represents a geometric figure and exhibits a cylindrical and a tapered shape.

7. The toothed coupling of claim 6 further comprising an annular and flange-like fastening element disposed at least at one of outer edge areas at faces of the first axial corrugated pipe.

8. The toothed coupling according to claim 1, further comprising a support cover having an external fastening component and an internal fastening component, wherein the support cover is secured to a member selected from the group consisting of coupling housing and the coupling component at its external fastening component and to the axial corrugated pipe at its internal fastening component by a method selected from the group consisting of welding and clamping.

9. The toothed coupling according to claim 7, wherein the fastening element of the axial corrugated pipe consists of several rings and comprises an external clamping ring and an internal adjusting ring, wherein the internal adjusting ring is inserted in said clamping ring, said axial corrugated pipe being secured to the clamping ring by means of a bonded connection to the clamping ring and wherein said clamping ring is mounted to a member selected from the group consisting of the coupling component and the coupling housing by screwing on the adjusting ring.

10. The toothed coupling according to claim 1, further comprising an annular recess disposed between the coupling housing and the coupling component, wherein the first axial corrugated pipe is positioned in said annular recess.

11. The toothed coupling according to claim 10, wherein the first axial corrugated pipe and the second axial corrugated pipe are positioned in the recesses.

12. The toothed coupling of claim 11, further comprising a first internal coupling component chamber, wherein the annular recess of the first coupling component has a circular cavity-shaped cross section at a respective face in relation to the first internal coupling component chamber;

a first camber center line of the second teeth of the first coupling component, wherein the first axial corrugated pipe is centrally mounted with respect to the first camber center line of the second teeth of the first coupling component and axially in relation to an axis of rotation of the coupling housing in the first internal coupling component chamber;

a second internal coupling component chamber;

a second annular recess, wherein the second annular recess of the second coupling component has a circular cavity-shaped cross section at a respective face in relation to the second internal coupling component chamber;

a second camber center line of the third teeth of the second coupling component, wherein the second axial corrugated pipe is centrally mounted with respect to the second camber center line of the third teeth of the second coupling component and axially in relation to an axis of rotation of the second coupling housing in the second internal coupling component chamber.

13. The toothed coupling according to claim 12, wherein the coupling housing consists of a first coupling housing half and of a second coupling housing half, wherein the first coupling housing half and the second coupling housing half are symmetrical, and further comprising a first flange formed on at the first coupling housing half;

a second flange formed on at the second coupling housing half and facing the first flange, wherein a flange region is formed between the first flange and the second flange, and wherein the first coupling housing half and the second coupling housing half are interconnected and are screwed together at the first flange and second flange;

a first internal cover secured to the first coupling housing half and directed in the flange area toward the first internal coupling component chamber, wherein the first internal cover seals the first internal coupling component chamber;

a second internal cover secured to the second coupling housing half and directed in the flange area toward the second internal coupling component chamber, wherein the second internal cover seals the second internal coupling component chamber.

14. The toothed coupling according to claim 13, wherein the second teeth of the first coupling component and the third teeth of the second coupling component form a cambered external tooth gearings, wherein the first teeth of the coupling housing form a straight internal tooth gearing, and wherein the cambered external tooth qearings and the straight internal tooth gearing together form tooth engagement gearings of the toothed coupling.

15. The toothed coupling according to claim 1, wherein the coupling housing is constructed as an intermediary piece, and wherein the axial corrugated pipe is positioned outside the first peripheral region of the coupling housing constructed as the intermediary piece and, while the coupling housing is enclosed by the peripheral region of the coupling component at its faces, the second teeth of the coupling component are constructed as an internal tooth gearing and the first teeth of the coupling housing are constructed as an external tooth gearing.

16. The toothed coupling according to claim 15, wherein the second teeth of the coupling component form a straight internal tooth gearing, wherein the first teeth of the coupling housing form a cambered external tooth gearing, and wherein the cambered external tooth gearing and the straight internal tooth gearing together form the tooth engagement gearing of a toothed coupling;

wherein the axial corrugated pipe is disposed tight fitting relative to the tooth engagement gearing.

17. The toothed coupling according to claim 15, further comprising
at least one filling hole furnished in the coupling housing;
a screw plug locking up the filling hole, wherein a lubricant is introducible through the filling hole into the internal coupling component chambers, wherein the internal coupling component chambers are separated from the flange area by means of the internal covers.

18. The toothed coupling according to claim 8, further comprising
a releasable locking element, wherein the external fastening component of the support cover is secured to a member selected from the group consisting of the coupling housing and the coupling component by means of the releasable locking element.

19. The toothed coupling according to claim 18, further comprising
free spaces sealed by the axial corrugated pipes and disposed between the support cover and the tooth engagement gearing;
at least a pressure compensation opening acting as a throttle, wherein the free spaces are connected to the corresponding internal coupling component chambers, representing internal free spaces, with the pressure compensation opening such that the lubricant and air flow through the pressure compensation opening thereby compensating for pressure.

20. The toothed coupling according to claim 19, wherein the free spaces are constructed as pneumatic springs.

21. The toothed coupling of claim 20, wherein a selected cross-section of the pressure compensation opening determines a force of the pneumatic springs.

22. A toothed coupling and in particular a double toothed coupling for rail vehicles, essentially consisting of a coupling housing (2; 5, 6) and at least one coupling component fitted inside the coupling housing (2; 5, 6), the coupling component (3, 4) has second teeth or third teeth (9, 10) in its peripheral region (7) and the coupling housing (2; 5, 6) has first teeth (11, 12) in its peripheral region which form engaging teeth (13, 14) with the second teeth and third teeth (9, 10) of the coupling component which teeth (9, 10; 10, 12) are movable in relation to one another, and there is at least one annular disk-shaped support cover (21, 22) protecting the engaging teeth (13, 14) at the respective faces (19, 20) between the coupling housing (2; 5, 6) and the coupling component (3, 4), wherein there is at least one axial corrugated pipe (18, 47) positioned between the coupling housing (2; 5, 6) and each coupling component (3, 4) secured to at least one of both parts (2, 3; 2, 4 or 5, 3; 6, 4) which seals engaging teeth within a fluid chamber (13, 14) and also resiliently sets a predetermined position of the coupling housing (2; 5, 6).

23. A toothed coupling of claim 22, wherein the corrugated pipes (18, 47) are axially mounted between the coupling housing (2) or the coupling halves (5,6) forming the coupling housing (2) and one corresponding coupling component (3,4) with or without initial tension;
said pipes providing that the coupling housing (2; 5, 6) is adjusted to a predetermined position between both coupling components (3, 4) in case of axial relative motion between the coupling components (3,4);
wherein the corrugated pipe (18, 47) is at least single-walled;
wherein the corrugated pipe (18, 47) is formed at least in simple multiple meanders with respect to its longitudinal section;
wherein depending on the intended strain, the undulated geometry of the corrugated pipe (18, 47) is accordingly designed so that the outer envelope (55) of the corrugated pipe (18, 47) represents a geometric figure;
wherein there is an annular or flange-like fastening element (53, 54; 40, 41; 68) at least one of the outer edge areas at the faces of the corrugated pipe (18, 47); wherein the fastening elements (53, 54; 40, 41; 68) of the corrugated pipes (18, 47) consist of several rings and basically comprise an external clamping ring (69) and an internal adjusting ring (70) which can be inserted in said clamping ring, said corrugated pipes (18, 47) being secured to the clamping rings (69) by means of a bonded connection to rings (69) and said clamping rings (69) are mounted to the coupling components (3, 4) or coupling housing (2) as the case may be by means of screwed adjusting rings (70);
wherein the corrugated pipe (18, 47) is positioned in an annular recess (50, 51) between coupling housing (2; 5, 6) and coupling component (3, 4);
wherein corrugated pipes are positioned one after the other, one inside the other and/or parallel to each other in recess (50; 51);
wherein the coupling components (3, 4) are provided with an annular recess (50, 51) in which the corrugated pipe (18; 47) is centrally mounted with respect to the camber center line (48; 52) of the coupling component teeth (9, 10) and axially in relation to the axis of rotation of the coupling housing (59);
wherein the coupling housing (2) basically consists of two coupling halves (5, 6) which are interconnected and are screwed to existing flanges (42, 43) which match the shape of the coupling halves (5, 6) and are positioned opposite to each other;
said coupling halves directed at the corresponding internal coupling component chamber (17, 65), contain an internal cover (45, 46) secured to the corresponding coupling half (5, 6) which seals the internal chamber;
wherein in the coupling housing (2) or, as the case may be, in the coupling halves (5, 6), there is at least one filling hole (57, 58) which can be locked-up in particular by means of a screw plug through which the lubricant is introduced into the internal coupling component chambers (17, 65) which is separated from the flange area (56) by means of the internal covers (45, 46).

24. The toothed coupling of claim 22, wherein support cover (21, 22) is secured to the clutch housing (2; 5, 6) or to the coupling component (3, 4) at its external fastening component (28, 29) and to the corrugated pipe (18, 47) at its internal fastening component (60, 61);
wherein the external fastening components (3, 4) of support covers (21, 22) are each secured to the coupling housing (2; 5, 6) or coupling components (3, 4) as the case may be;
wherein there are free spaces (15, 16) sealed by means of the corrugated pipes between support cover (21, 22) and engaging teeth which are connected to the corresponding internal coupling component chambers (17, 65) representing the internal free spaces by means of at least one pressure compensation opening (30, 31) for the purpose of throttling so that the lubricant and in particular oil as well as air can flow through the opening thereby compensating for pressure;
wherein the free spaces (15, 17) or (16, 65) as the case may be are designed as pneumatic spring;

wherein the selected cross-section of the pressure compensation opening (30, 31) determines the forces of the pneumatic spring.

25. The toothed coupling according to claim 2, wherein the coupling housing is adjusted to a predetermined, central position between the first coupling component and the second coupling component; and wherein the axial corrugated pipe resiliently sets a predetermined position of the coupling housing relative to the coupling component.

26. The toothed coupling of claim 23, wherein the coupling housing (2; 5, 6) is adjusted to a predetermined, central position between both coupling components (3, 4);

wherein the corrugated pipe (18, 47) preferably consists of a bellow of corrosion-proof material;

wherein the outer envelope (55) of the corrugated pipe (18, 47) has a cylindrical or a tapered shape;

wherein the annular recess (50, 51) is formed with a circular cavity-shaped cross section at the respective faces in relation to the internal coupling component chamber (17, 65);

wherein the two coupling halves (5, 6) are formed symmetrical;

wherein said coupling halves are directed at the corresponding internal coupling component chamber (17, 65) in the flange area (56);

wherein the engaging teeth (13, 14) of coupling (1) each consist of a straight internal tooth gearing (11, 12) of coupling housing (2; 5, 6) and an engaging cambered external tooth gearing (9, 10) of the coupling component (3, 4).

27. The toothed coupling of claim 24, wherein the wherein support cover (21, 22) is secured to the clutch housing (2; 5, 6) or to the coupling component (3, 4) at its external fastening component (28, 29) and to the corrugated pipe (18, 47) at its internal fastening component (60, 61) by welding or clamping;

wherein the external fastening components (3, 4) of support covers (21, 22) are each secured to the coupling housing (2; 5, 6) or coupling components (3, 4) as the case may be by means of a releasable locking element (38, 39).

28. A toothed coupling of claim 22, wherein the corrugated pipes (18, 47) are axially mounted between the coupling housing (2) or the coupling halves (5,6) forming the coupling housing (2) and one corresponding coupling component (3,4) with or without initial tension;

said pipes providing that the coupling housing (2; 5, 6) is adjusted to a predetermined position between both coupling components (3, 4) in case of axial relative motion between the coupling components (3,4);

wherein the corrugated pipe (18, 47) is at least single-walled;

wherein the corrugated pipe (18, 47) is formed at least in simple multiple meanders with respect to its longitudinal section;

wherein depending on the intended strain, the undulated geometry of the corrugated pipe (18, 47) is accordingly designed so that the outer envelope (55) of the corrugated pipe (18, 47) represents a geometric figure;

wherein there is an annular or flange-like fastening element (53, 54; 40, 41; 68) at least one of the outer edge areas at the faces of the corrugated pipe (18, 47);

wherein the fastening elements (53, 54; 40, 41; 68) of the corrugated pipes (18, 47) consist of several rings and basically comprise an external clamping ring (69) and an internal adjusting ring (70) which can be inserted in said clamping ring, said corrugated pipes (18, 47) being secured to the clamping rings (69) by means of a bonded connection to rings (69) and said clamping rings (69) are mounted to the coupling components (3, 4) or coupling housing (2) as the case may be by means of screwed adjusting rings (70);

wherein the corrugated pipe (18, 47) is positioned in an annular recess (50, 51) between coupling housing (2; 5, 6) and coupling component (3, 4);

wherein corrugated pipes are positioned one after the other, one inside the other and/or parallel to each other in recess (50; 51);

wherein the coupling components (3, 4) are provided with an annular recess (50, 51) in which the corrugated pipe (18; 47) is centrally mounted with respect to the camber center line (48; 52) of the coupling component teeth (9, 10) and axially in relation to the axis of rotation of the coupling housing (59);

wherein the coupling housing (2) basically consists of two coupling halves (5, 6) which are interconnected and are screwed to existing flanges (42, 43) which match the shape of the coupling halves (5, 6) and are positioned opposite to each other;

said coupling halves directed at the corresponding internal coupling component chamber (17, 65), contain an internal cover (45, 46) secured to the corresponding coupling half (5, 6) which seals the internal chamber;

wherein the coupling housing (2; 5, 6) is designed as intermediary piece and the corrugated pipe (18, 47) is positioned outside the peripheral region of the coupling housing (2; 5, 6) designed as intermediary piece and, as the coupling housing (2) is enclosed by the peripheral regions of coupling component (3, 4) at its faces, the coupling component teeth in the form of second teeth and third teeth are designed as internal tooth gearing and the coupling housing teeth in the form of first teeth are designed as external tooth gearing; wherein the engaging teeth seal the corrugated pipes (18, 47) which consist of cambered first teeth in the form of an external tooth gearing of the coupling housing or the coupling halves as the case may be and straight second teeth and third teeth in the form of internal tooth gearing of the coupling components;

wherein in the coupling housing (2) or, as the case may be, in the coupling halves (5, 6), there is at least one filling hole (57, 58) which can be locked-up in particular by means of a screw plug through which the lubricant is introduced into the internal coupling component chambers (17, 65) which is separated from the flange area (56) by means of the internal covers (45, 46).

29. A toothed coupling for rail vehicles, essentially consisting of a coupling housing and having a first peripheral region;

a coupling component fitted inside the coupling housing and having a second peripheral region;

first teeth having first faces and disposed in the first peripheral region of the coupling housing;

second teeth having second faces and disposed in the second peripheral region of the coupling component, wherein the first teeth are engaging with the second teeth of the coupling component, and wherein the first teeth are movable in relation to the second teeth and vice versa;

an annular disc-shaped support cover protecting the first teeth at their first faces and protecting the second teeth at their second faces between the coupling housing and the coupling component;

an axial corrugated pipe positioned between the coupling housing and the coupling component and secured to a member of the group selected from coupling component and coupling housing for sealing, the first teeth and the second teeth within a fluid chamber, for preventing fluid loss, for preventing gear tooth contamination and to perform as a biasing means.

* * * * *